``

US009115001B2

(12) United States Patent
Dos Santos Antunes et al.

(10) Patent No.: US 9,115,001 B2
(45) Date of Patent: Aug. 25, 2015

(54) PROCESS FOR NANOMATERIAL SYNTHESIS FROM THE PREPARATION AND DETONATION OF AN EMULSION, PRODUCTS AND EMULSIONS THEREOF

(75) Inventors: Elsa Marisa Dos Santos Antunes, Aljustrel (PT); João Manuel Calado Da Silva, Aljustrel (PT); Ana Lúcia Costa Lagoa, Santa Iria de Azóia (PT)

(73) Assignee: Innovnano—Materiais Avançados, S.A., Aljustrel (PT)

( * ) Notice: Subject to any disclaimer, the term of this patent is extended or adjusted under 35 U.S.C. 154(b) by 23 days.

(21) Appl. No.: 13/879,579

(22) PCT Filed: Oct. 14, 2011

(86) PCT No.: PCT/IB2011/054567
§ 371 (c)(1),
(2), (4) Date: May 15, 2013

(87) PCT Pub. No.: WO2012/049660
PCT Pub. Date: Apr. 19, 2012

(65) Prior Publication Data
US 2013/0224488 A1   Aug. 29, 2013

(30) Foreign Application Priority Data
Oct. 15, 2010   (PT) .......................................... 105339

(51) Int. Cl.
| | | |
|---|---|---|
| *C01D 1/02* | (2006.01) | |
| *B01J 3/08* | (2006.01) | |
| *B82Y 30/00* | (2011.01) | |
| *C01G 23/047* | (2006.01) | |
| *C01G 25/02* | (2006.01) | |
| *C01G 45/12* | (2006.01) | |
| *C06B 23/00* | (2006.01) | |
| *C06B 47/14* | (2006.01) | |

(52) U.S. Cl.
CPC ... *C01D 1/02* (2013.01); *B01J 3/08* (2013.01); *B82Y 30/00* (2013.01); *C01G 23/047* (2013.01); *C01G 25/02* (2013.01); *C01G 45/1235* (2013.01); *C06B 23/00* (2013.01); *C06B 47/145* (2013.01); *C01P 2002/34* (2013.01); *C01P 2002/50* (2013.01); *C01P 2004/64* (2013.01); *C01P 2006/10* (2013.01); *C01P 2006/12* (2013.01); *Y10T 428/2982* (2015.01)

(58) Field of Classification Search
CPC ....... C01D 1/02; Y10T 428/2982; B01J 3/08; B82Y 30/00; C01G 23/047; C01G 25/02; C01G 45/1235

USPC .................................. 428/402; 977/773, 786
See application file for complete search history.

(56) References Cited

U.S. PATENT DOCUMENTS 8,557,215 B2 *  10/2013  Calado Da Silva et al. .......................... 423/593.1

FOREIGN PATENT DOCUMENTS

| | | | |
|---|---|---|---|
| DE | 10 2006 046 805 A1 | | 12/2007 |
| EP | 1 577 265 A1 | | 9/2005 |
| EP | 1577265 | * | 9/2005 |
| WO | WO2009/040770 | * | 4/2009 |
| WO | WO 2009/040770 A2 | | 4/2009 |
| WO | WO2009/144665 | * | 12/2009 |
| WO | WO 2009/144665 A2 | | 12/2009 |
| WO | WO2010/059070 | * | 5/2010 |
| WO | WO 2010/059070 A1 | | 5/2010 |

OTHER PUBLICATIONS

Xiao Hong Wang et al: Nano-MnFe2O4 powder synthesis . . . Applied Physics A; Materials Science & Processing, vol. 90, No. 3 Mar. 1, 2008 pp. 417-422.*
Xie X et al: "Detonation synthesis of zinc oxide . . . " Materials Letters, North holland Publishing Company, vol. 60, No. 25-26, Nov. 1, 2006.*
Xie et al. (2006). Detonation synthesis of zinc oxide nanometer powders. *Materials Letters*, 60, 3149-3152.
Wang et al. (2007). Nano-MnFe$_2$O$_4$ powder synthesis by detonation of emulsion explosive. *Applied Physics A*, 90(3), 417-422.
International Search Report and Written Opinion of the International Searching Authority, mailed Mar. 29, 2012 in connection with PCT International Application No. PCT/IB2011/054567, filed Oct. 14, 2011.

* cited by examiner

*Primary Examiner* — Leszek Kiliman
(74) *Attorney, Agent, or Firm* — John P. White; Cooper & Dunham LLP (57) ABSTRACT

The present invention refers to a nanomaterial synthesis process from the decomposition and subsequent reaction among common and economical insoluble precursors, or precursors which hydrolyze in contact with water, which are incorporated in the internal phase of an emulsion. These insoluble precursors are introduced in the internal phase of an emulsion, then being subject to decomposition and subsequent reaction in the solid state, under shockwave effect during the detonation of the emulsion, the nanomaterial with the intended structure being in the end obtained. The process of the present invention therefore allows obtaining a wide range of nanomaterial as composites or binary, ternary structures or higher structures, with small-sized homogenous primary particles, applicable to several technological fields.

20 Claims, 3 Drawing Sheets

PROCESS FOR NANOMATERIAL SYNTHESIS FROM THE PREPARATION AND DETONATION OF AN EMULSION, PRODUCTS AND EMULSIONS THEREOF

CROSS-REFERENCE TO RELATED APPLICATIONS

This application is a §371 national stage of PCT International Application No. PCT/IB2011/054567, filed Oct. 14, 2011, claiming priority of Portuguese Patent Application No. 105339, filed Oct. 15, 2010, the contents of each of which are hereby incorporated by reference in its entirety.

TECHNICAL DOMAIN OF THE INVENTION

The present invention refers to a nanomaterial synthesis process from the decomposition and subsequent reaction among insoluble precursors, or precursors which hydrolyze in contact with water, incorporated in the internal phase of an emulsion, under the effect of a shock resulting from the emulsion detonation, thus allowing the process implementation in a wide range of nanomaterials.

BACKGROUND OF THE INVENTION

Nanomaterials inferior to 100 nm are constituent blocks of a new and recently emerging subject area, designated nanotechnology. In fact, an enormous interest all over the world is now observed towards the "very small". From scientific areas to politics itself, nanotechnology is also frequently present in main world leaders' speeches. It is presented as holding the potential of providing a technological discontinuity with as relevant positive implications in citizen life as past historical events, such as the discovery of steam machines, the train, the automobile, the computer and biotechnology. Such enthusiasm is a result of particles or structures, such as films, pores or nanometric surfaces within a given material, presenting a group of electrical, optical, magnetic and mechanical properties, which are different from those of the same material having superior dimensions. In particular, we refer to properties such as high plasticity, super hardness, lower melting point, transparency and high surface area per mass unit with a consequent improvement in catalytic activity, low thermal conductivity, an increase on the magnetic effect, high semiconductor luminescence, color alterations, and inclusively quantum mechanics laws compliance. Some scientists inclusively propose a theory on the probable state of matter.

In recent years, and as a result of the knowledge on these new properties, a thorough investigation has been observed towards the development of new nanomaterial production having production yield at an industrial scale (ton/day) which supports a safe large-scale incorporation of these materials in multiple applications. The known methods, which are thoroughly referred to in the literature, are divided into three major categories:

I—Liquid-Phase Methods

This category comprises a group of methods already established or in industrialization imminence, namely: a) sol-gel, b) co-precipitation and c) hydrothermal and electrochemical synthesis. These have as common principle a starting material in solution or gel form, wherein precursors are either dissolved to a molecular scale or dispersed in the desired stoichiometric proportion. In a following stage, these precursors are decomposed in controlled manner, a precipitate being formed, usually as an hydroxide, which requires several subsequent treatment stages, such as calcination, for its conversion into an oxide with the desired crystalline structure, being followed by a final breakdown by grinding process.

The major drawback/limitation in these liquid-phase methods, apart from low production rates, are associated with high liquid/solvent amounts, which must be later removed or eliminated so as to maintain the nanoparticles in low aggregation. In this removal process, the solvent must be carefully and meticulously separated from the nanoparticles, thus implying compulsory recycling and treatment systems for liquid effluents, which consume plenty of energy and require complex equipments of time consuming operation. Furthermore, by increasing the surface area per mass unit associated to nanomaterial, its solubility (including that of some oxides) considerably increases, thus causing toxicity problems in resulting effluent liquids.

III—Gaseous-Phase Methods

These methods comprise processes for both the production of individual nanoparticles and for direct application in surface coating, namely a) combustion synthesis, b) spray pyrolysis, c) evaporation/oxidation of metals, plasma, CVD, PVD, laser deposition, etc. Generally, these methods are based on the vaporization of the precursors introduced in a variety of solvents. After turning into the gaseous state, the chemical intended reaction among precursors occurs, followed by nanoparticle condensation, with the consequent heat release, which implies the inevitable and undesirable coalescence and coagulation stages of the formed nanoparticles, thus causing aggregate formation and therefore showing a major drawback of this method.

Once the first stable molecules of condensed nanoparticles come from the gaseous state, this methodology is usually designated by "bottom-to-top" approach, that is, it starts from the individual molecule to a first stable structure.

The most common nanomaterials obtained in gaseous phase and for long commercially available are silica and titanium dioxide (pigment), both resulting from the hydrolysis of respective chlorides. The decomposition of the later also brings forth complicated environmental issues associated to the production of chlorine and hydrochloric acid as reaction by-products. On the other hand, despite their large surface areas, the high agglomeration degree in these materials obstructs their use in applications (non-catalytic) requiring non-agglomerated particles.

II—Solid-Phase Methods

In this category, nanoparticles are usually prepared from a first slow reaction in the solid state among different precursors, such as carbonates, oxides etc. It is also designated "mechanosynthesis", wherein the reaction activation energy is supplied by a mill, being followed by an intensive grinding process until particles inferior to 200 nm are obtained. The main limitations in this low-cost method, besides the difficulties observed in obtaining dimensions inferior to 0.2 microns, are related to the presence of impurities, with a non-homogeneous particle-size distribution and essentially at a deficient homogeneity degree, especially when it comes to synthesizing composites and ternary structures or superior structures, originated by incomplete diffusion reactions among reagents. From a conceptual perspective, and unlike previous methods, this is a "top-to-bottom" approach wherein the starting point is a micrometric structure, whose dimension will be consecutively reduced by mechanical energy application.

The use of the emulsion detonation concept as nanomaterial synthesis method is disclosed in a set of recent documents:

EP1577265, "Production of fine powder of aluminium oxide" discloses an industrial process for the production of micrometrical alumina from a cyclic detonation method of mixed granulated aluminum with an oxidizer, the later possibly being an emulsion (w/o). This has distinct steps, including the previous preparation of a class-1 substance (explosive) and wet collection: it essentially implies feeding the granulate material into the reactor; being followed by the explosion; the products thus obtained passing to the wet chamber; subsequent cooling and final collection stage of the material. The process thus described differs from that described in the present invention in that the process is carried out in gaseous phase and does not include insoluble precursors, either stable or instable when in contact with water.

WO2009040770 "Nanocrystalline spherical ceramic oxides, process for the synthesis and uses thereof" discloses a synthesis process for spherical micrometrical particles, with nanocrystalline structure, from the detonation of an emulsion (w/o) at a detonation temperature superior to the melting point of the oxides thus formed, allowing these to assume a spherical form.

This is a synthesis method exclusively carried out in gaseous phase and mainly using soluble precursors or metals. This process only allows obtaining micrometric dimension oxides. This process differs from the technical characteristics of the solution described by the present invention in that it is carried out in gaseous phase and does not include insoluble precursors, either stable or instable when in contact with water.

WO2009144665 "Nanometric-sized ceramic materials, process for their synthesis and uses thereof" discloses a method for nanomaterial synthesis, such as binary, ternary and higher oxides, nitrates and carbonates, from an emulsion (w/o) detonation at low temperatures (inferior to the ceramic nanomaterial melting point), with dissolution of soluble metallic precursors in oxidizing phase (internal), or from the addition of soluble propellants to the external phase or addition of metals or metal alloys, after emulsion formation. This is a synthesis method exclusively carried out in gaseous phase and mainly using soluble precursors or metals similarly to the methods described in the preceding documents, therefore differing from the method described by the present invention which is based on a solid-phase synthesis resorting to insoluble precursors, either stable or instable when in contact with water.

Xiao Hong Wang et al. (Nano-$MnFe_2O_4$ powder synthesis by detonation of emulsion explosive. Applied Physics A: Materials Science & Processing. Vol. 90, no. 3, March 2008) discloses nanoparticle synthesis of a ferrite ($MnFe_2O_4$) from the detonation of an emulsion (w/o) ignited by a military explosive (RDX), wherein the precursors (iron nitrates and manganese, respectively) were previously dissolved in the internal phase. Just as with the previous methods, this is a synthesis method exclusively carried out in gaseous phase and mainly using soluble precursors in oxidizing phase of the emulsion, consequently differing from the method herein disclosed.

Xinghua Xie et al. (Detonation synthesis of zinc oxide nanometer powders. Materials Letters, Vol. 60, issues 25-26, November 2006. Pp 3149-3152) discloses a process for obtaining ZnO and $Li_2O$ nanoparticles from the detonation of an emulsion, in which lithium and zinc nitrates were dissolved in the internal phase. This emulsion is later ignited by a no. 8 detonator, placed inside a military explosive (RDX). Just as with the previous methods, this is a synthesis method exclusively carried out in gaseous phase and mainly using soluble precursors in oxidizing phase of the emulsion, which also resorts to the use of explosive material (class 1), RDX and detonators. This process differs from the technical characteristics of the solution described by the present invention in that it is carried out in gaseous phase and does not include insoluble precursors, either stable or instable when in contact with water.

The process of the present invention is generally within the scope of "solid-phase methods" and aims at overcoming the limitations associated with this category of methods, namely: difficulty in obtaining dimensions inferior to 0.2 microns, impurities present in the emulsion, time-consuming reaction times and low homogeneity degree in composites or ternary structures, due to incomplete diffusion reaction among reagents, upholding the use of common and cheap insoluble precursors, such as carbonates and metallic hydroxides.

GENERAL DESCRIPTION OF THE INVENTION

The present invention refers to nanomaterial synthesis in solid phase, in which reaction is induced by a shock from the detonation of an emulsion, wherein insoluble precursors were previously fed.

The process of the present invention is based on endothermic decomposition and subsequent reaction among water-insoluble precursors present in the emulsion.

Within the present invention, "insoluble precursor" represents a set of compounds exhibiting one of two characteristics:

Insolubility in water not dissolving in salts composing them. Examples are carbonates, hydroxides or oxides;

When in contact with water, they dissolve by hydrolysis in the respective oxide. Examples are alkoxides or metal carboxylates.

Since being precursors, whose decomposition is an endothermic process, energy must be provided in order to actuate the desired reaction. So being, in the present method, energy is provided by the shockwave caused during detonation of the emulsion wherein precursors were previously added.

In fact a detonation reaction speed between 4000-6000 m/s causes pressures between 50,000-115,000 bar at the reaction front, respectively, which will compress the precursors and consequently actuate an interruption of their chemical connections and subsequent reaction, thus resulting in the formation of the intended solid state nanomaterial.

The resulting nanoparticles separate very quickly at the hot reaction zone oriented by gases from the detonation which scatter in a radial direction at high speed rates.

Similarly to conventional methods in solid phase, the process of the present invention also uses common water-insoluble solid precursors as starting material, such as hydroxides, oxides, carbonates, or compounds which hydrolyze in contact with the water, such as carboxylates and metal alkoxides etc., the process being therefore applicable within a new sub-category of high-pressure solid-phase methods. In the present process, the nanomaterial is the result of thermal decomposition and subsequent reaction among starting precursors, induced by the shock wave of an emulsion detonation, to which the insoluble solid precursors were previously fed into the internal phase, in other words, by endothermic decomposition reaction in the solid state, the precursors do not react in the so-called reaction front, thus not providing any gaseous species supporting the shockwave progress. The conversion reaction in the nanomaterial with the intended structure only occurs subsequently to the Chapman-Jouget point (C,J), during the isentropic expansion of the gases. Since occurring at extremely high pressures between 50,000-115,000 bar, this solid-phase reaction provides a set of advantages in terms of mechanosynthesis, both at a procedural level and in terms of the final properties of the obtained materials, namely:

Nearly-instantaneous reaction times, in microseconds;

Obtaining of composites, as well as of binary, ternary structures or higher structures;

Obtaining highly homogeneous nanomaterial as far as particle crystalline phase composition is concerned. "High homogeneity degree" within the scope of present invention means that the material obtained by the said process has a crystalline phase percentage superior to 90%;

Nanomaterial with high-pressure production properties, such as nanocrystallinity, the amorphism, alteration of phase diagram or emergence of unique crystalline phases;

Alteration of electrical, thermal, magnetic, mechanical and other values associated to nanomaterial obtained at low-pressure, as a result of the phenomena associated to high-pressure, such as PIM (Pressure Induced Metalization), superconductivity, PIA (Pressure Induced Amorphization), phase transformations (graphite—Diamond).

The process according to the present invention aims at obtaining a multiplicity of nanomaterial in the form of composites or binary, ternary structures or superior structures, with homogeneous primary particles of small dimension from a solid-state reaction among starting insoluble precursors.

Figure 1:
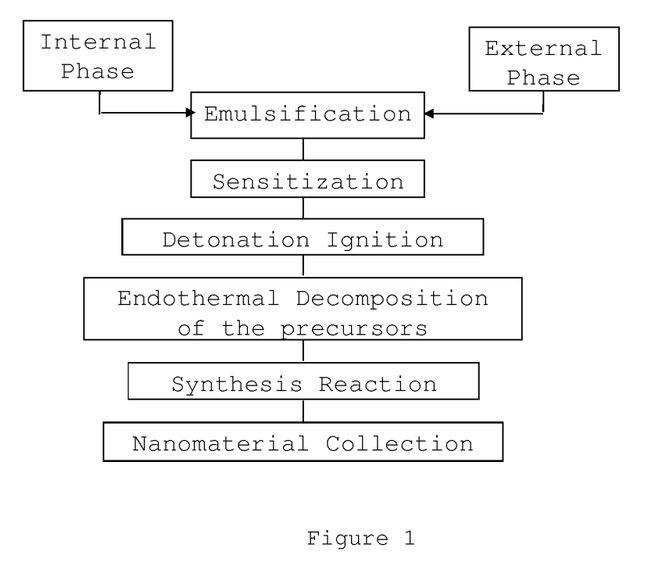
FIG. 1 shows the set of stages for nanomaterial synthesis (internal phase and external phase) for obtaining of the emulsion and subsequent stages for nanomaterial synthesis.

In general, the method herein proposed comprises the following stages (FIG. 1):

a) Preparation of the emulsion, wherein the precursor selection is included in stoichiometric amounts, and the incorporation thereof in the internal phase of the emulsion, preparation of the external phase, and the emulsification of both phases;

b) Sensitizing of the emulsion a), preferably by incorporating hollow silica, polymeric, gasification spheres or any other method known in the art;

c) Ignition of the emulsion detonation b), preferably by using a detonator or any other ignition process such as laser or capacitive discharge, as well as a base ignition emulsion.

The following occurs as a result thereof:

1. Decomposition of the precursors, in the respective oxides under shockwave effect;
2. Reaction among oxides, the nanomaterial with the intended structure being thus obtained;
3. Expansion and cooling to atmospheric pressure;
4. Collection of the formed nanomaterial, for instance, in wet process.

1. Preparation of the Synthesis Emulsion

The synthesis emulsions prepared according to the present invention are categorized in two types:

a) water-in-oil (w/o), when containing water in its composition, or b) melt/oil (m/o), when containing no water in its composition.

In any case, the emulsions should preferably comprise an ammonium nitrate-based and oxygen-rich internal phase, and a propellant external phase formed by hydrocarbon derivatives. The external phase is added with a surfactant reducing the surface tension among both phases, thus allowing their subsequent emulsification.

1.1. Precursor Selection

The nanomaterial precursors meant for inclusion in the emulsion are selected from a group of water-insoluble solids, such as hydroxides, oxides, carbonates, or insoluble compounds which hydrolyze when in contact with water, such as carboxylates or alkoxides. The relative amounts and proportions thereof are determined by the empirical formula of the intended end compound and chemical reaction stoichiometry; by means of these two parameters, it is possible to calculate the required amount per precursor for the formation of the intended composition. As general rule, the total amount of precursors in the emulsion should be inferior to 70% in weight of its overall composition, so as to guarantee the existence of sufficient energy for the progression and support of the detonation reaction.

1.2 Preparation of the Internal Phase of the Emulsion 1.2.1 Precursor (In)Solubility State In order to obtain a complete reaction in the solid state, during the subsequent stage of detonation, it is elementary that precursors selected for the nanomaterial synthesis are added during preparation of the internal phase of the emulsion. This innovative step has two important consequences:

a) It improves the precursor distribution along the emulsion structure, providing a subsequent faster detonation reaction, thus resulting in an increase on the shock energy release (proportional to the detonation speed range). This increase on the released energy allows achieving a complete detonation reaction, a nanomaterial with an exceptional homogeneous crystalline structure being obtained;

b) Reduction of the viscosity in the emulsion, when compared to an equivalent situation in which the same amount of precursors is added and homogenized in a phase subsequent to the emulsification. Viscosity is an essential parameter for the process of the present invention to take place, whilst assuring the stability of the emulsion along the several processing stages.

1.2.2 Physical State of Ammonium Nitrate

Figure 2:
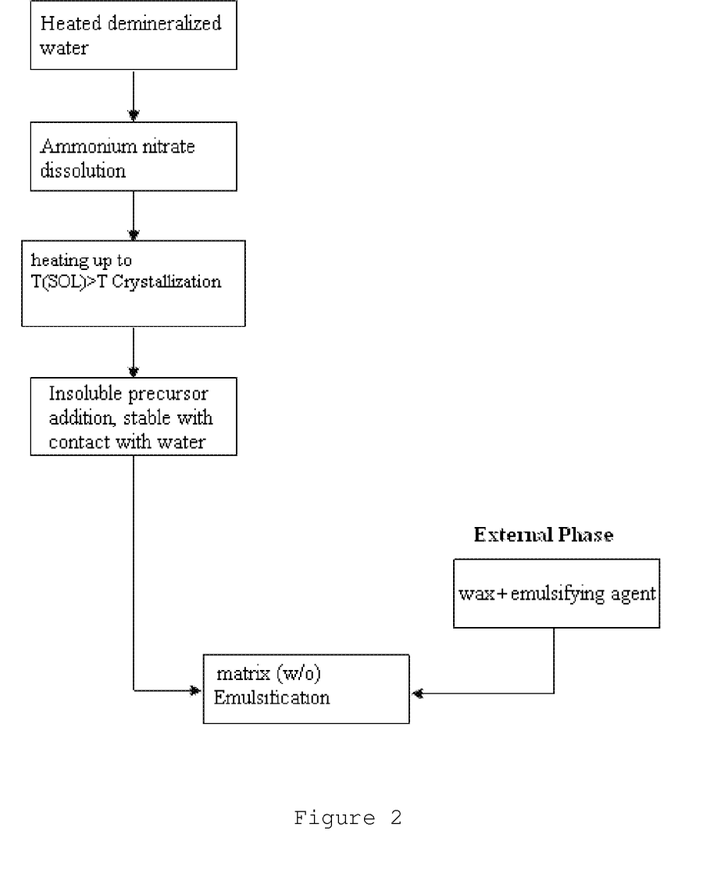
FIG. 2 shows the preparation stages of the synthesis emulsion's internal phase with stable insoluble precursor incorporation in contact with water, such as carbonates, hydroxides, or oxides and wherein the external phase consists of a mixture of paraffinic waxes, mineral oils and an emulsifying agent.
Figure 3:
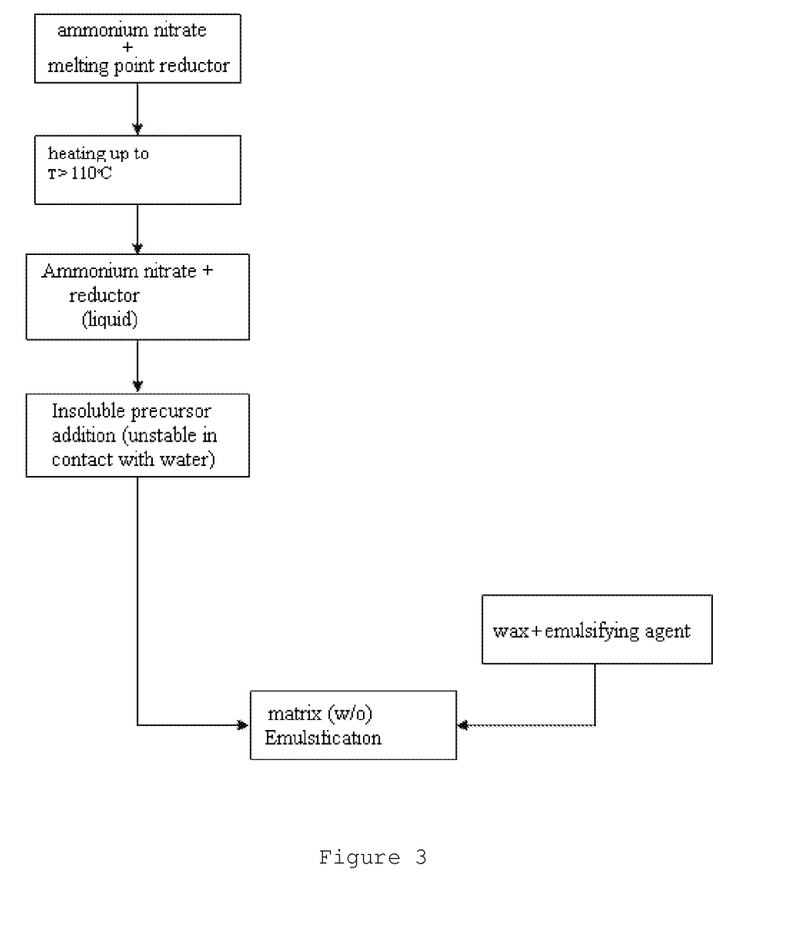
FIG. 3 shows the preparation stages of the synthesis emulsion's internal phase with stable insoluble precursors which hydrolyze and decompose in the presence of water, such as alkoxides, carboxylates and organometallic compounds and wherein the external phase consists of a mixture of paraffinic waxes, mineral oils and an emulsifying agent.

This is another key aspect of the method of the present invention, once it allows using a wide range of conventional insoluble precursors, either stable or unstable when contacting with water. This property is related to the physical state under which ammonium nitrate is fed into the emulsion and which might adopt two different forms, giving rise to two distinct emulsion concepts:

a) Water-in-oil (w/o) emulsion, wherein the solid ammonium nitrate is previously dissolved in water, forming an aqueous solution at about 105° C., being subsequently emulsified with the external phase (propellant) within an emulsion. This kind of emulsion is formed whenever the selected precursors are stable when contacting with water, such as hydroxides, carbonates, oxides etc. (FIG. 2).

b) melt/oil (m/o) emulsion, wherein the ammonium nitrate remains in melted liquid form mixed with a compound. Subsequently to being heated, this compound forms a liquid mixture having a melting point inferior to that of the ammonium nitrate (160° C.), later resulting in a water-free emulsion. This kind of emulsion is preferably used whenever the selected precursors decompose in the presence of water/moist, such as alkoxides, carboxylates, organometallic compounds etc. (FIG. 3).

The compounds meant to be added to ammonium nitrate, for the purposes of decreasing its melting point and which should also be water-insoluble (propellants), may be selected among inorganic salts, alcohols or compounds such as glycine, succinic acid, urea, etc.

Generally, the selection is carried out based on cost and safety criteria and aiming at obtaining a mixture melting point inferior to 130° C. Urea is one of the preferred compounds, for the purposes of the present invention, once they comply with all criteria mentioned.

1.3. Preparation of the External Phase of the Emulsion

The external phase being the one responsible for determining the general physical and chemical characteristics of the emulsion, its adequate selection and preparation is highly decisive for the compliance with a set of requirements inherent to the present invention:

a) The emulsion should be detonated inside the reactor, without a housing, so as to avoid that the pyrolysis thereof results in the presence of contaminant substances in the final nanomaterial. For such purpose, the final rheology of the emulsion should present a significantly high consistency, with a viscosity superior to 200,000 cps assuring the composition support and necessary self-confinement so as to guarantee a stable detonation.
b) On the other hand, the emulsified composition should have a relatively low viscosity/consistency during the first stages of the process, so as to guarantee its simple processing (emulsification, pumping, air injection, etc.).
c) Additionally, it must be formed in different geometries: cylindrical, planar, or spherical.

In order to accomplish these opposing requirements, the external phase of the emulsion is preferably based on hydrocarbon derivatives, for example waxes such as paraffinic or microcrystalline waxes, among others, or mixtures of waxes with mineral oils or mineral waxes with polymers, which, upon heating and liquefaction, have extremely low viscosity indexes (between 4 and 20 cps at 40° C.), thus assuring a simple formation of the emulsion and processing thereof, and which upon sudden cooling change into the solid state, thus providing high consistency to the emulsion, which is an important requirement for the detonation stage, exempt from any pre-forming housing. In a preferred embodiment of the present invention, paraffinic waxes with low melting point (inferior to 65° C.) are used, once they allow operating within a large temperature range between 65-95° C., in liquid state, also allowing carrying out all processing stages required for the preparation of internal/external phases, emulsification, etc., with low viscosity indexes.

1.4. Emulsification

Water-in-oil (w/o) or melt/oil (m/o) matrix emulsion is prepared from the emulsification obtained in internal and external phases of the emulsion, under mechanical energy effect within a equipment such as a static mixer, a jet mixer, or colloid mill. The internal phase is aqueous and oxygen-rich, whereas the external phase is propellant consisting of paraffinic waxes or mixtures thereof with mineral oils, to which a surfactant was previously added, which enables a decrease on surface tension among both phases. In order to obtain a stable emulsion, micelles must have a size distribution from 1 to 10 microns and a 60,000 to 100,000 cps viscosity at 85° C.

2. Sensitization of the Emulsion

The emulsion sensitization is usually carried out by adjusting its final density to a value inferior to 1.30 g/cm$^3$, by adding a group of substances which feed and disperse a great number of microspheres thereinto. Such feeding may occur by direct injection and homogenization of a gas by chemical reaction, or by adding solid particles which retain the gas in its interior.

These microspheres, when adiabatically compressed under mechanical energy or external pulse, form a group of "hot points" achieving about 400-600° C. within them. This stage is carried out in a significant short time, among $10^{-3}$ to $10^{-5}$ s, actuating and supporting the detonation progress along the emulsion, at a speed superior to 4000 m/s.

3. Ignition of the Detonation

The detonation ignition in the emulsion may be actuated from a detonator or any other system with similar effects, such as capacitive or laser discharge etc. However, according to detonation theory, the shockwave requires a length as long as two to five times its diameter (in the case of a cylindrical geometry), in order to stabilize at a speed superior to 4000 m/s. Therefore, another emulsion (w/o) is preferably prepared, designated base or ignition emulsion, which is bound to the emulsion containing the precursors and mainly consisting of ammonium nitrate and water in the internal phase, and mineral oil and emulsifying agent in the external phase, so as to avoid contaminant solid formation. This base or ignition emulsion should have a positive oxygen ratio, having a length as long as two to five times its diameter, so as to guarantee that the shockwave is completely stabilized at a level superior to 4000 m/s, when achieving the second emulsion, the synthesis emulsion (containing the precursors) assuring that no non-homogeneity occurs during the synthesis of the nanomaterial.

This first emulsion (base or ignition emulsion) preferably comprises:

ammonium nitrate: 70-80%
Water: 10-15%
Mineral oil: 3-4%
Emulsifying agent: 0.75-1.5%

Additionally, it has a density between 1.15 and 1.30 g/cm$^3$.

So being, the detonation ignition in the process of the present invention may be actuated by laser or capacitive discharge. Depending on the sensitivity of the emulsion composition, it might be directly ignited or ignited by another non-contaminating and more sensitive emulsion (ignition emulsion), which provides the necessary shock energy to detonate the emulsion of the present invention. In a preferred embodiment of the present invention, the detonation ignition in the synthesis emulsion is accomplished by means of an ignition emulsion.

4. Nanomaterial Collecting and Processing

Dust is dragged by incoming gases from the detonation reaction into an expansion chamber, in which is preferably wet collected, so as to avoid dust accumulation in the air. Following, the collected material is sieved, dried at a temperature constantly inferior to 70° C. and finally deagglomerated and housed.

5. Nanomaterial

The process of the present invention allows obtaining nanomaterial with single (one element), binary (two elements), ternary (three elements) structures or higher, as well as composites (combinations of two different nanomaterials), with surface areas superior to 10 m$^2$/g and consisting of primary particles between 5-80 nm. These properties are obtained from the shockwave along the emulsion, whose effect actuates the following mechanisms, almost simultaneously:

a) Decomposition and fragmentation of the soluble precursors, with conversion of the respective oxide;
b) Reaction among several oxides, in order to form the intended final compound;
c) Expansion and prompt cooling of the final compound at about 100,000 Kelvin/s, thus minimizing the coalescence/coagulation phenomena.

DESCRIPTION OF THE DRAWINGS

For a clearer understanding of the present invention, drawings are herein attached which represent preferred embodiments of the invention and which do not intend to limit the scope of the present invention.

DETAILED DESCRIPTION OF THE INVENTION

The process for obtaining nanometric material is started by selecting the insoluble precursors in the adequate stoichiometric proportion, as well as the remaining components of the synthesis emulsion, and by preparing the ignition emulsion.
1. Emulsion Preparation
1.1 Ignition Emulsion The preparation of this emulsion is started by dissolving ammonium nitrate in demineralized water, within a stirring and heated tank, an ammonium nitrate solution (internal phase) being thus formed. Following, the internal phase emulsification occurs, by means of a mineral oil and emulsifying agent mixture (external phase), inside an emulsifier, an emulsion matrix being obtained. Finally, 0.5% polymeric microspheres are added into a plastic tank at a low stirring rate, so as to provide an emulsion which is more sensitive to a detonator or any other type of ignition system (laser or capacitive discharge).
1.2 Preparation of the Internal Phase of the Synthesis Emulsion 1.2.1 Depending on the compatibility criterion among selected precursors and water, the ammonium nitrate is:
 a) Dissolved, in case of precursors compatible with water, such as carbonates, oxides and hydroxides, in demineralized water, at a concentration about 80-90% and heated until a temperature between 95-105° C. superior to the crystallization temperature of the mixture is achieved, so as to form a fully transparent solution exempt from visible crystals.
 b) Mixed with a compound which reduces its melting point, being followed by a slow and gradual heating with steam, until a temperature of 110° C. and the liquid state are achieved.

1.2.2 Continuously, the selected precursors are added to the ammonium nitrate in aqueous solution or liquefied, in stoichiometric proportions according to the crystalline structure intended for the nanomaterial meant to be synthesized, the mixtures being held under stirring so as to guarantee their homogeneity.
1.3. Preparation of the External Phase of the Emulsion The external phase or propellant is prepared by previous melting hydrocarbon derivatives, such as mineral oil and/or waxes, such as paraffinic or microcrystalline waxes among others, wax mixtures with polymers, preferable a paraffinic wax, having a melting point between 40-70° C., and subsequent mixture with an emulsifying agent, an HLB (hydrophile/lipophil), which is suitable for the formation of the water in oil emulsion (w/o). The external phase generally represents about 2-30% of the emulsion composition.
2. Emulsification The emulsification of the internal phase of the emulsion, in an emulsified matrix, is carried out in a known emulsifier. Subsequently, the matrix is refined at about 60-150 psi, by passing the emulsion through restrictor static mixers.
3. Sensitization of the Emulsion Afterwards, and according to the intended final density, in order to assure the emulsion sensitivity (usually inferior to 1.25 g/cm$^3$), the addition of an organic sensitizer is carried out (0.2 to 2%), such as expanded polystyrene or contaminant-free polymeric spheres, or by adding and homogenizing air inside the emulsion structure, which is assured by passing the air/emulsion mixture through a static mixer.
4. Nanomaterial Collecting and Processing Dust is dragged by incoming gases from the detonation reaction into an expansion chamber, in which it is preferably wet collected, so as to avoid dust accumulation in the air. Following, the collected material is sieved, dried at a temperature constantly inferior to 70° C. and finally deagglomerated and housed.
5. Characterization of the Nanomaterial The nanomaterial obtained by the present method is characterized by:
 a) Multiple crystalline structures:
  Binary, such as: cubic, hexagonal, Fluorite, Rutile, etc;
  Ternary, such as: spinel, Perovskite, calcite, olivine, etc;
  Superior structures, such as: Garnet, Pseudo Brookite, etc.
 b) Size of primary particles inferior to 100 nm, preferably 70 nm, and more preferably inferior to 20 nm or 5 nm.
 c) Surface areas superior to 10 m$^2$/g, preferably superior to 50 m$^2$/g, and more preferably, between 10-500 m$^2$/g.

EXAMPLES

In a preferred embodiment of the present invention, there is provided a first emulsion, designated emulsion 1, or ignition emulsion, which is responsible for the detonation reaction stabilization, being followed by emulsion 2 or synthesis emulsion, containing the composition comprising the different precursors. In these examples, 50 g of emulsion 1 were used, the same having subsequently been completed with about 400 g emulsion 2.

Example 1

Preparation of Emulsion 1 or Ignition Emulsion

Paraffinic wax (melting point 56° C.) (80%)+emulsifying agent (20%): 4.975%

NH$_4$NO$_3$: 84.575%

H$_2$O: 9.95%

Plastic sensitizer (polymeric spheres): 0.5%

Emulsion 1 is prepared by dissolving NH$_4$NO$_3$ in demineralized water within a stirred and heated tank, an ammonium nitrate solution being formed—internal phase. Then, the internal phase emulsification is carried out with a mixture of paraffinic wax and emulsifying agent (external phase), heated up to 75° C., within an emulsifier adequate to the viscosity range, an emulsified matrix being thus obtained. Afterwards, about 0.5 polymeric spheres are added into a tank at a significantly low stirring rate, so as to obtain a 1.15 g/cm$^3$ density, followed by pre-forming and sudden cooling stages for a 35 mm cylinder geometry, so as to provide an emulsion having the required consistency, which avoids the use of a housing for detonating purposes and which is simultaneously sensitive to ignition by detonator or any other type of ignition, as previously described.

Example 2

Synthesis of Nanometric Cubic Zirconia, Stabilized with Yttria 8Y (8 mol), from Insoluble Precursors Fed into the Internal Phase of the Emulsion 1.400 g of an emulsion were prepared as follows and having the following components/quantities:
paraffinic wax (70%)+emulsifying agent (30%): 5.5%
57.42% ammonium nitrate;
7.83% demineralized water;
25% zirconium carbonate;
3.75% yttrium carbonate;
polymeric sensitizer: 0.5%.

1.1 Preparation of the Internal Phase of the Emulsion

Solid ammonium nitrate (99.9% purity) is dissolved in demineralized water at a 88% concentration, in a stainless steel tank heated with steam, the mixture being stirred at a temperature of about 98° C., so that a complete clarified solution is obtained (exempt from crystals). The pH value of the solution is adjusted with ammonium carbonate up to a value between 5 and 6. The zirconium carbonate 25% and yttrium carbonate 3.75% solid precursors are added, the heating with steam being maintained until the solution is restored to 98° C. The preparation of the internal phase will then be complete.

1.2 Preparation of the External Phase of the Emulsion

The preparation is based on melting a paraffinic wax (representing 70% in weight of the external phase) having a melting point at 56° C., followed by a temperature increase up to 65° C., a PIBSA-based emulsifying agent (Polyisobutylene Succinic Anhydride) being then added (30% in weight of total external phase). The mixture remains under heating in another stainless steel tank at 75° C., thus allowing it to remain in the liquid state, without however degrading the emulsifying molecule.

1.3 Emulsification

The internal phase is firstly placed in an emulsifier tank having slow stirring and an external sleeve heated up to 85° C. Continuously, the external phase is slowly and at a constant pace added and maintained under stirring so as to avoid solid carbonate deposition. When addition is complete, the necessary mechanical energy is applied to the emulsion (700 rpm) for 5 min, until a 80,000-100,000 cps viscosity is achieved.

1.4 Sensitization

Afterwards, about 0.75 polymeric spheres are added into a tank at a significantly low stirring rate, so as to obtain a 1.05 g/cm$^3$ density, followed by pre-forming and sudden cooling stages for a 35 mm cylinder geometry, so as to provide an emulsion having the required consistency, which avoids the use of a housing.

1.5 Ignition

A no. 8 detonator is applied to the 400 g of the synthesis emulsion, having a cylindrical geometry and high consistency, in order to actuate the detonation.

1.6 Detonation/Decomposition/Reaction

By actuating of the detonation, the energy from the shockwave fragments and decomposes the zirconium and yttrium carbonates into their respective oxides, with carbon dioxide release, and it continuously induces its reaction in the solid state within the expansion area, a cubic zirconia having perfectly-distributed 8-mol yttria within its structure.

Table I shows a summary of the procedural parameters and the nanometric properties of cubic zirconia.

Example 3

Synthesis of Nanometric LiMn$_2$O$_4$ Spinel with Precursors Applied in the Internal Phase of the Emulsion 1.400 g of an emulsion were prepared as follows and having the following components/quantities:
paraffinic wax (70%)+emulsifying agent (30%): 5.5%
65.06% ammonium nitrate;
8.87% demineralized water;
2.77% lithium carbonate;
17.3% manganese carbonate;
Polymeric sensitizer: 0.5%

1.1 Preparation of the Internal Phase of the Emulsion

Solid ammonium nitrate (99.9% purity) is dissolved in demineralized water at a 88% concentration, in a stainless steel tank heated with steam, the mixture being stirred at a temperature of about 98° C. The pH value of the solution is adjusted with ammonium carbonate up to a value between 5 and 6. Manganese carbonate 17.3% and lithium carbonate 2.77% are added, the heating with steam being maintained until the solution is restored to 98° C., the preparation of the internal phase being then complete.

1.2 Preparation of the External Phase of the Emulsion

Similar to item 1.2 in Example 2.

1.3 Emulsification

The internal phase is firstly placed in an emulsifier tank having slow stirring and an external sleeve heated up to 85° C. Continuously, the external phase is slowly and at a constant pace added and maintained under stirring so as to avoid solid carbonate deposition. When addition is complete, the necessary mechanical energy is applied to the emulsion (700 rpm) for 5 min, until a 80,000-100,000 cps viscosity is achieved.

1.4 Sensitization

Afterwards, about 0.5 polymeric spheres are added into a tank at a significantly low stirring rate, so as to obtain a 1.15 g/cm$^3$ density, followed by pre-forming and sudden cooling stages for a 35 mm cylinder geometry, so as to provide an emulsion having the required consistency, which avoids the use of a housing.

1.5 Ignition

Following, 400 g of the synthesis emulsion, having a 35 mm cylindrical geometry and preceded by 50 g emulsion 1 or ignition emulsion is added, whereinto a no. 8 detonator is applied which will actuate the detonation.

1.6 Detonation/Decomposition/Reaction

By actuating of the detonation, the energy from the shockwave fragments and decomposes the lithium and manganese carbonates into their respective oxides, with carbon dioxide release, and it continuously induces its reaction in the solid state within the expansion area, a LiMn$_2$O$_4$ spinel being thus obtained.

Table I shows a summary of the procedural parameters and the nanometric Lithium/manganese oxide spinel properties

Example 4

Synthesis of TiO$_2$ from the Detonation of a Water-Free Matrix 1.400 g of an emulsion were prepared as follows and having the following components/quantities:
paraffinic wax (70%)+emulsifying agent (30%): 5.5%
59.2% ammonium nitrate;
14.8% urea;
20% titanium isopropoxide;
Polymeric sensitizer: 0.5%

1.1 Preparation of the Internal Phase of the Emulsion

A solid ammonium nitrate (99.9% purity) and urea (99.9% purity) mixture is heated with steam in a stainless steel tank at about 110° C., the mixture being held under stirring. Titanium isopropoxide in liquid state it finally added and homogenized. The preparation of the internal phase is complete.

1.2 Preparation of the External Phase of the Emulsion

The external phase is prepared as in examples 2 and 3.

1.3 Emulsification

The emulsification is prepared as in examples 2 and 3.

1.4 Sensitization

Afterwards, about 0.5 polymeric spheres are added into a tank at a significantly low stirring rate, so as to obtain a 1.15 g/cm$^3$ density, followed by pre-forming and sudden cooling stages for a 35 mm cylinder geometry, so as to provide an emulsion having the required consistency, which avoids the use of a housing.

1.5 Ignition

Following, 400 g of the synthesis emulsion, having a 35 mm cylindrical geometry and preceded by 50 g ignition emulsion, is added whereinto a no. 8 detonator is applied which will actuate the detonation.

1.6 Detonation/Decomposition/Reaction

By actuating of the detonation, the energy from the shockwave fragments and decomposes the isopropoxide in the titanium oxide.

Table I shows a summary of the procedural parameters and the nanometric TiO$_2$ properties

TABLE I

Results from the three Examples

| Parameters | Example 2 | Example 3 | Example 4 |
|---|---|---|---|
| Viscosity Pre-mixture (Pa · s) | 60 | 70 | 90 |
| Temperature Pre-mixture (° C.) | 85° C. | 85° C. | 95° C. |
| Final density (g/cm$^3$) | 1.05 | 1.15 | 1.15 |
| Ignition emulsion | No | Yes | Yes |
| Particle size (TEM) | 15 (nm) | 70 nm | 20 nm |
| Crystalline phases | ZrO$_2$ (cubic) 100% | LiMn$_2$O$_4$ 100% | Anatase 70% Rutile 30% |
| BET (m$^2$/g) | 35 | 18 | 65 |

Example 2 shows solid insoluble precursor feeding into the internal phase of the emulsion so as to provide a ZrO$_2$ binary structure having a nanometric primary particle size around 15 nm, not resorting to any ignition emulsion.

Example 3 shows the capability of the several insoluble precursors (carbonates), existing within the internal phase, to synthesize a ternary structure under detonation wave effect.

Example 4 depicts the capability of the detonation emulsion, having a water-free composition in the internal phase, to include precursors which hydrolyze with water (alkoxides), thus allowing its decomposition in the intended oxide (TiO$_2$) to occur only at a subsequent stage by detonation wave effect.

The following claims define further embodiments of the present invention.

The invention claimed is:

1. A process for nanomaterial synthesis from the detonation of at least one emulsion which comprise the following steps:
   a) preparation of a synthesis emulsion based on internal and external phases and resulting emulsification of both phases;
   b) sensitization; and
   c) detonation ignition,
   wherein said internal phase represents between 70%-98% of the emulsion composition and were previously fed with water-insoluble solid precursors or insoluble precursors which hydrolyze in contact with water.

2. A process according to claim 1, wherein the water-insoluble solid precursor of the internal phase is a carbonate, a hydroxide or an oxide.

3. A process according to claim 1, wherein the insoluble precursor which hydrolyzes in contact with water of the internal phase is an alkoxide or a metal carboxylate.

4. A process according to claim 1, wherein the sensitization phase comprise hollow silica, polymer or gasification spheres.

5. A process according to claim 1, wherein the detonation ignition runs at a speed between 4000-6000 m/s and causes pressures in the range of 50000 to 115000 bar.

6. A process according to claim 1, wherein the said synthesis emulsion is:
   a water in oil emulsion (w/o) when containing water within its composition or
   a melt/oil emulsion (m/o) when exempt from water in its composition.

7. A process according to claim 6, wherein the synthesis emulsion further contains ammonium nitrate or urea.

8. A process according to claim 1, wherein the external phase of the synthesis emulsion comprises at least one hydrocarbon derivative.

9. A process according to claim 1, wherein the external phase of the synthesis emulsion further comprises a surfactant.

10. A process according to claim 1, wherein detonation is ignited by using an ignition emulsion.

11. A synthesis emulsion used in the process according to claim 1, wherein the emulsion:
    is a water in oil emulsion (w/o), when containing water in its composition, or
    is a melt oil emulsion (m/o), exempt from water in its composition;
    and comprises in its internal phase insoluble precursors or insoluble precursors which hydrolyze in contact with water.

12. An emulsion according to claim 11, wherein the total amount of precursors is less than 70% in weight of its overall composition.

13. An emulsion according to claim 12, further comprising ammonium nitrate in the internal phase.

14. An emulsion according to claim 11, comprising ammonium nitrate dissolved in water in the liquid phase.

15. An emulsion according to claim 14, comprising a compound which decreases melting temperature of the ammonium nitrate.

16. An emulsion according to claim 11, further comprising a hydrocarbon derivative-based external phase which may be paraffinic, microcrystalline waxes, or wax/polymeric mixtures.

17. An emulsion according to claim 16, wherein the hydrocarbon derivatives in the external phase have viscosity indexes between 0.004 e 0.020 Pa·s, when liquefied.

18. An emulsion according to claim 11, wherein the external phase further comprises a surfactant.

19. A nanomaterial, obtainable according to the process of claim 1 and formed as a composite and/or single, binary, ternary or higher structures, with surface areas greater than 10 m$^2$/g.

20. A nanomaterial according to claim 19, wherein the primary particles are homogeneous, crystalline or amorphous and have a dimension less than 100 nm.

\* \* \* \* \*